April 30, 1968     J. L. HOLDEN ETAL     3,380,168
LIQUID-LEVEL INDICATING MEANS Filed Nov. 3, 1965     3 Sheets-Sheet 1

April 30, 1968   J. L. HOLDEN ETAL   3,380,168
LIQUID-LEVEL INDICATING MEANS
Filed Nov. 3, 1965   3 Sheets-Sheet 2

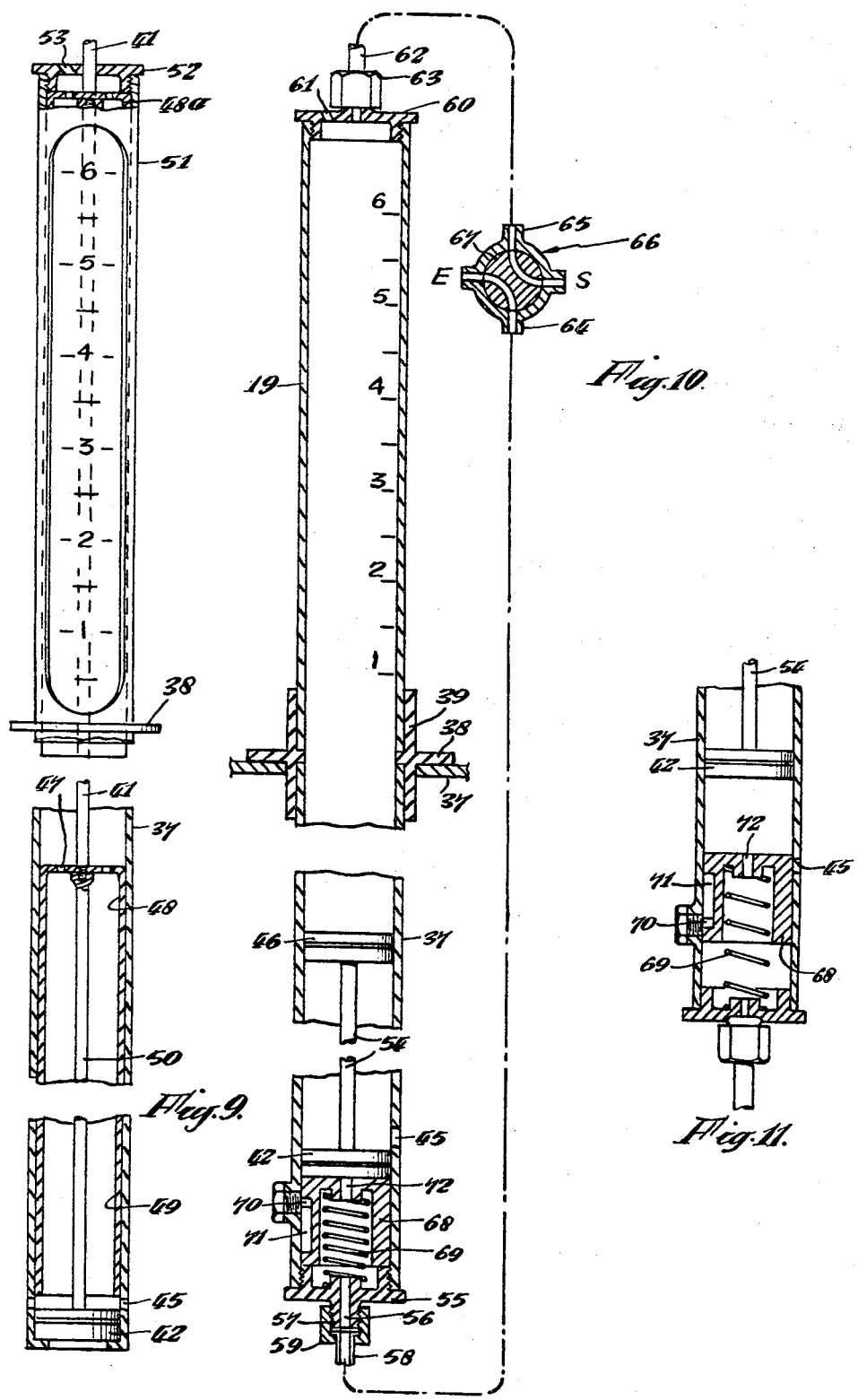

3,380,168
LIQUID-LEVEL INDICATING MEANS
John Leonard Holden, "Hillcrest," Park Road, Haltwhistle, England, and Philip John Holden, B.S.A. Police Depot, P.O. Box 8005, Salisbury, Southern Rhodesia
Filed Nov. 3, 1965, Ser. No. 506,191
Claims priority, application Great Britain, Nov. 3, 1964, 44,749/64
8 Claims. (Cl. 33—126.4)

ABSTRACT OF THE DISCLOSURE

The purpose of the invention is to provide means for the indication of the level of liquid in a container, comprising an elongated cylinder depending into the container and having an extension projecting from the upper end of the container, and normally open valve means at the lower end of said cylinder such that a column of liquid entering the tube, and rising therein to the level of the liquid in the container, may be maintained and raised within the cylinder and into said extension, wherein it can be inspected against gauge markings.

---

This invention has for an object to provide improved means for indicating the level of a liquid within a container especially a container which is inaccessible and/or cannot be provided with a conventional sight glass or level indicator.

A more particular object of the invention is to provide means for indicating the level of oil in an engine crankcase or sump.

It is common in the case of a liquid held in a container accessible only with difficulty, such as the crank-case of an engine in a vehicle, or an underground tank, to measure the liquid level with a dipstick. It is usually necessary to withdraw the dipstick and wipe it clean, then reinsert it and withdraw it again in order to obtain a true indication of the liquid level by the extent of wetting of the previously cleaned stick. Our invention avoids this disadvantageous procedure.

The invention provides an indicator of the level of liquid in a container, comprising means locatable to depend into the liquid and to receive a column of the liquid having a height up to the upper level limit of said liquid in the container, means for raising said receiving means out of the container, means for maintaining said column at its original height during said raising, and level gauge means against which said column is visible when raised.

Various embodiments of liquid level indicators may be provided within the scope of the invention, and further features thereof will be better understood from the following description given by way of example with reference to the accompanying drawings, wherein:

FIG. 9 is a view, partly in section, of yet another embodiment,

FIG. 10 is a view, partly in section, of an indicator similar to that of FIG. 8, modified for actuation by pneumatic motive means, and FIG. 11 is a section corresponding to the lower part of FIG. 10, showing the receiving means for a column of liquid in course of being raised.

In the following description and in the drawings like or equivalent parts are referred to by the same reference numerals.

Figure 1:
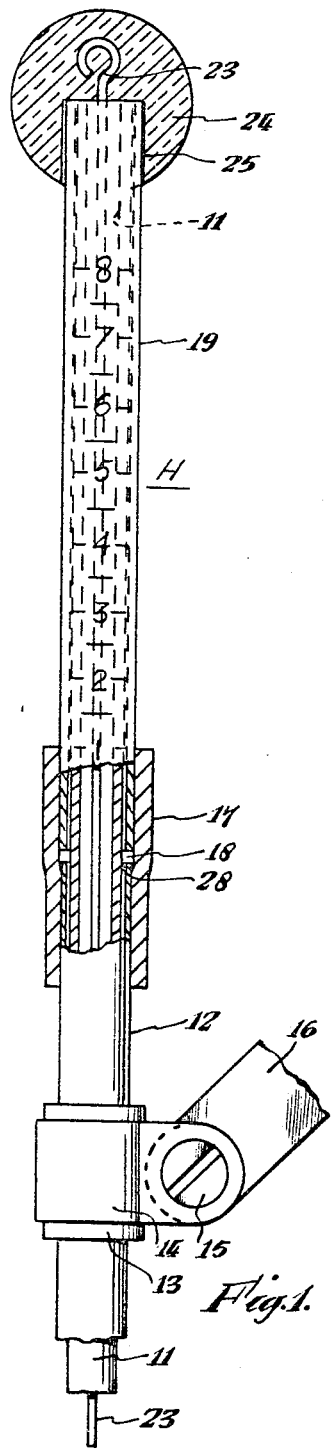
FIG. 1 is a side elevation, partly in section, of the upper part of one form of indicator.

The liquid level indicator shown in FIGS. 1–3 comprises a transparent tubular member 11 locatable so as to depend into a liquid in a container, such a lubricating oil sump of an engine to a point below the minimum permissible level of the liquid. The member 11 is encased in a sheath tube 12 which extends upwardly out the container and is provided with supporting means shown as a resilient collar 13 securable by a band 14 adapted to be clamped on the collar by a screw 15. The collar 13 and band 14 may be of any suitable diameter and adapted to rest on a filling orifice for the container, being slidable on the sheath 12 to adjust the extent to which the lower end of the indicator depends into the liquid. Alternatively, the band 14 may be secured to a bracket element shown as part of strip 16, that may have any suitable form and be attached to the exterior of the container or an adjacent fixed member. A sleeve 17 tightly embraces the upper part of the sheath tube 12, on the end of which is located a wiper ring 18 surmounted by a tubular gauge element 19 of transparent material, the lower part of which is also embraced by the sleeve 17. The level gauge means comprises gauge marking which may be formed on the element 19 by moulding or etching, shown in the arbitary form of a scale 1–8. Such scale, in the case of an indicator for use in an engine sump, may be replaced by a pair of "minimum" and "maximum" level markers or rings, which may be adjustable on the element 19.

The transparent tube 11 has a length to extend from the upper end of the gauge element 19 nearly to the lower end of the sheath 12, which is provided with lateral apertures or ports 20 to facilitate passage of liquid into and from the sheath. The lower end of the tube 11 is belled outwards, and this belling provides an annular seat 21 for a valve body 22, as well as an external flange to serve as a stop for upward displacement of the tube 11. The valve body 22 is suspended on a wire 23 passing through the tube 11, and the upper end of this wire is secured in a spherical knob 24 which has a cylindrical recess 25 extending upwardly and having a diameter to receive the upper end of the gauge element 19, for which it serves as a cap.

The length of the wire 23 is such that when the knob 24 is pushed down as shown in FIG. 1 on to the gauge element 19, and the upper end of the transparent tube 11 which is thus depressed to its maximum extent through the wiper ring 18 which frictionally embraces it, the valve body 22 is separated from the seat 21 to permit flow of liquid into or from the interior of the tube 11. Thus this tube will receive a column of the liquid up to the maximum level L—L (FIG. 2) of the liquid in the container.

For raising the received column of liquid while maintaining at its original height for measurement against the gauge scale, the knob 24 is lifted. The knob acts through the wire 23 first to close the valve body 22 upon the seat 21 to maintain said column, as shown in FIG. 3, and secondly to raise the tube 11. To enable discharge of liquid from the space between the tube 11 and the sheath 12, the latter has ports 26 above said maximum level L—L. At the limit of the upward displacement, as shown in FIG. 3, the flange 27 on the lower end of the tube 11 engages an inturned flange 28 on the upper end of the sheath tube 12. At this location, the lower part of the transparent tube 11 having been wiped clean by the ring 18, the column of liquid is visible through the gauge element 19 and the tube 11, and its height H (FIGS. 1 and 3) can be measured against the scale.

Figure 2:
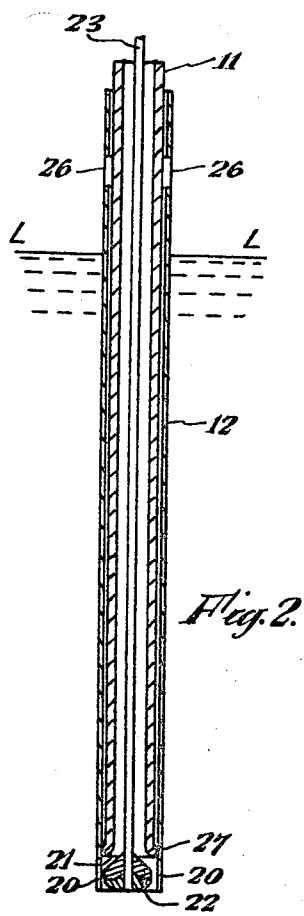
FIG. 2 is a vertical section of the lower part of the same indicator.

Thereafter, the knob 24 can be depressed, to push the tube 11 downwards through the ring 18, and finally to displace the valve body 22 from its seat 21 to the position shown in FIG. 2. Evidently, in this position, as the level in the container varies, liquid may pass into or from the tube 11 over the valve body 22, so that the height of the column in the tube extends up to the level of liquid in the container.

Figure 4:
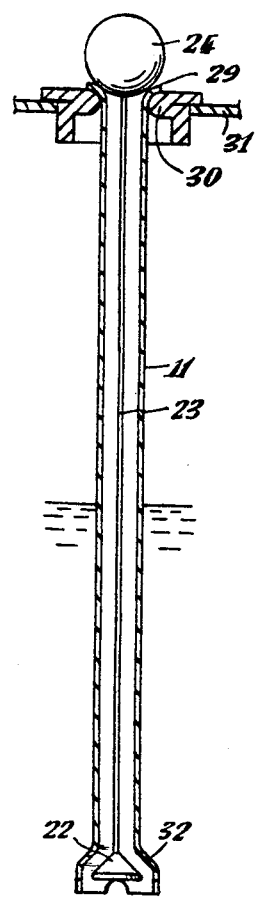
FIG. 4 is a vertical section of another form of indicator depending into a liquid in a container.
Figure 5:
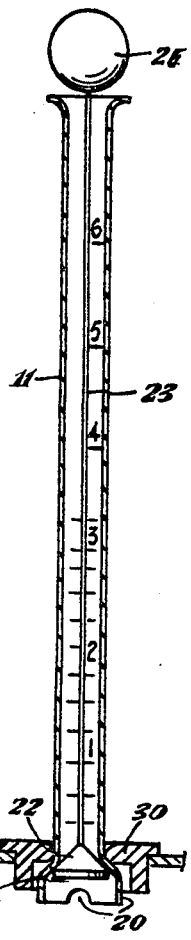
FIG. 5 shows such other form of indicator raised out of the container.

FIGS. 4 and 5 show another embodiment in simpler form, adapted for use in casks, tanks and other industrial containers for liquid. In this embodiment, the transparent tube 11 has no sheath, and its upper end is outwardly swayed to provide, or is fitted with, a flange 29. This flange is adapted to rest upon a supporting member 30 fitted into an aperture in the container 31, which member also serves as a limit stop in co-operation with a modified bell 32 at the lower end of the tube 11, when this tube is raised to protrude from the container as shown in FIG. 5. The tube 11 also serves as the gauge element, having gauge markings, shown as a scale 1–6, formed on its exterior as by moulding or etching. Recesses 20 are formed at the lower end of the tube 11 to facilitate passage of liquid into or from the tube.

Figure 3:
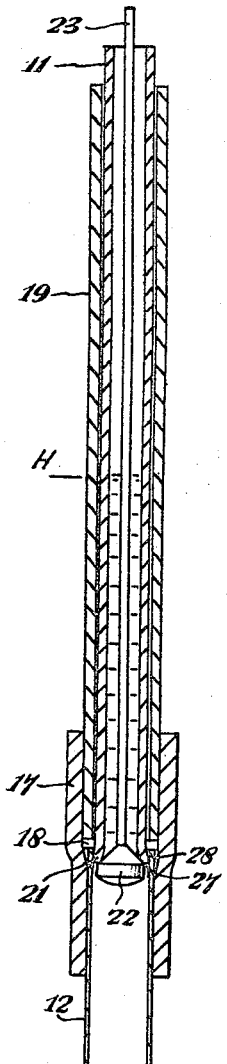
FIG. 3 is a section, corresponding to FIG. 1, showing a column of liquid raised into said upper part.

The mode of operation of this embodiment is similar to that of FIGS. 1–3. Firstly, lifting of the knob 24 closes the valve body 22 upon its seat within the bell 32 by means of the wire 23 and then the tube 11 is lifted out of the container, to the position shown in FIG. 5, at which the level of the column of liquid maintained in the tube 11 by the closure of the valve is visible against the gauge scale.

Figure 6:
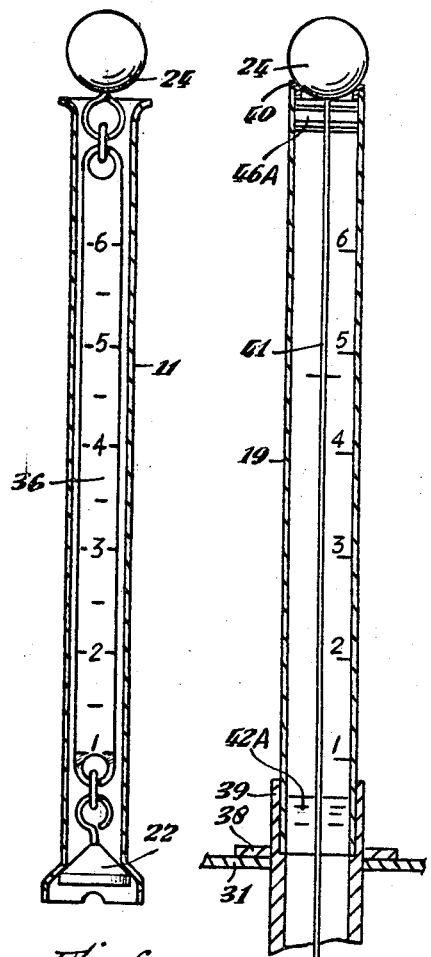
FIG. 6 shows a modification of the indicator according to FIGS. 4 and 5.

FIG. 6 illustrates a modification of the indicator last described, in that the gauge markings are provided not on the transparent tube but on a strip-like link 33 which forms part of a tensile chain between the knob 24 and the valve body 22. This enables an indicator to be provided without the need for forming permanent gauge markings on the tube 11, and enabling provision of different kinds of gauge markings, according to the shape of the container in which the indicator is to be used. For example the gauge markings may comprise a non-linear scale adapted for measuring the height of liquid in a container of non-uniform area, such as a cask or barrel or a tank which is spherical or a horizontally disposed cylinder.

Figure 7:
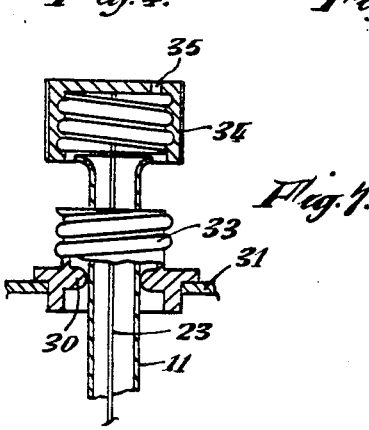
FIG. 7 is a fragmentary section of another modification.

FIG. 7 illustrates a detail modification applicable to the embodiments heretofore described. As illustrated, the support member 30 for the transparent tube 11, as shown in FIG. 4, is provided with an integral neck presenting externally a screw thread 33, and the knob 24 is substituted by an internally screw-threaded cap 34 into the top of which the wire 23 is secured. Thus, when the indicator is lowered into a container in the manner shown in FIG. 4, the cap 34 may be screwed upon the neck 33 to provide an effective closure for the top of the indicator. The cap as illustrated is shown with a vent hole 35. Various types of screw cap are well known, which provide vent means for the release of internal pressure while preventing the entry of air from the atmosphere.

Evidently a screw cap closure of the kind shown in FIG. 7 may be applied to the embodiment illustrated in FIGS. 1–3, by providing at the upper end of the transparent gauge tube 19 a portion having a suitable external screw thread, and replacing the knob 24 (FIG. 1) by an internally screw-threaded cap.

Figure 8:
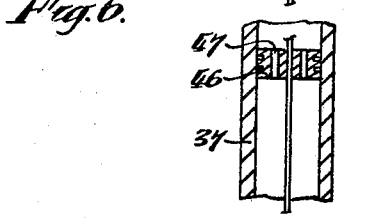
FIG. 8 is a section of further embodiment.
Figure 8:
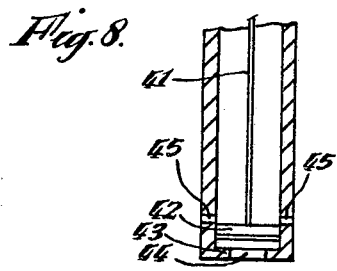

FIG. 8 shows a different form of liquid level indicator, wherein the means to receive a column of liquid from the liquid in a container comprises a cylinder 37 of suitable length depending into the container, part of which is shown at 31. The cylinder has a flange 38 which rests upon the exterior of the container about an aperture therein. The cylinder is surmounted by a transparent tubular gauge element 19 supported in a collar 39 extending upwardly from the flange 38, the lower part of the cylinder 37 and said gauge element 19 having the same internal diameter.

At the upper end of the gauge element 19 there is provided a member 40 of suitable form to provide upwardly a seat for a knob 24 from which depends a rod 41 having a piston 42 secured to its lower end. The rod 41 is of such diameter as to be capable of pushing the piston 42 to the lower end of the cylinder 37, where there is provided an inwardly turned flange 43 serving as a stop for the piston, and a central aperture 44 which avoids creation of a vacuum during initial raising of the piston. In the wall of the cylinder 37, immediately above the upper surface of the piston 42 in its said lower position, there are provided ports 45 to permit the entry of liquid from the container so that a column of liquid having a height up to the level of the liquid in the container is received and maintained by the cooperation of the cylinder and piston 42. The knob 24 and its seat 40 are so arranged as to provide an air vent at the upper end of the indicator, or alternatively a vent may be provided in the wall of the cylinder 37 above the maximum level of liquid in the container, e.g. immediately below the part of the container which supports the cylinder.

Evidently, in this arrangement the piston 42 can be displaced upwardly in the cylinder 37 by lifting the knob 24. Initial movement of the piston 42 closes the ports 45, so that the column of liquid received in the cylinder 37 is maintained during lifting of the piston. When the said piston reaches the position 42A at the lower part of the gauge element 19, the column of liquid supported by said piston is visible against the scale marked on said element 19. Upon the piston being again depressed to its lowermost position by pushing with the knob 24 upon the rod 41, the liquid is permitted to move into and out of the cylinder freely, through ports 45, according to variations of level of the liquid in the container.

An indicator as above described with reference to FIG. 8, having a single piston 42, is suitable for non-viscous liquids which will flow freely down the internal surfaces of the gauge element 19 and the cylinder 37, so that firstly the interior surface of the gauge element is left clean and secondly residual liquid left upon said surfaces after a test of the level does not affect a later test. For use of this type of indicator with a more viscous liquid, or one which tends to cling to the interior surfaces, there may be provided upon the rod 41 a second piston 46 spaced from the piston 42 to such an extent that when said piston 42 is raised to a position 42A at the lower part of the gauge element 19 the piston 44 is raised to a position 46A at the upper end of said gauge element, whereat the inner part of the element 40 serves as a stop against further displacement. In order to permit free displacement of liquid into and from the cylinder 37 through ports 45, the piston 46 is provided with at least one vent 47. Evidently after lifting a column of liquid for measurement against the gauge markings, when the pistons 42 and 46 are jointly depressed again by the rod 41, the piston 46 will clean the interior of the gauge element 19 and also displace liquid clinging to the interior surfaces of said element and the cylinder 37 downwards, substantially to the level of liquid in the container.

The embodiment shown in FIG. 9 is a modification of the double-piston arrangement described with reference to FIG. 8, and has an inverted elongated cup 48 of transparent material in place of the upper piston. The lower end 49 of the wall of this cup is annularly spaced from the upper surface of the piston 42 to a small extent, substantially equal to the depth of the lateral ports 45. As shown, the base of the inverted cup 48 and the piston 42 are spaced apart by a rod 50 having an upper socket end into which is screwed the lower end of the operating rod 41, the cup base being secured between these two ends. In order to permit the passage of liquid into and from the receiver comprised by said cup and piston from a container in which the cylinder 37 depends, the base of the cup has at least one vent 47. The inverted cup 48 itself also serves as a gauge element having gauge means, arbitrarily shown as a scale 1–6, marked on its exterior surface as indicated at the upper part of FIG. 9.

The arrangement is such that when the receiver comprised by piston 42 and inverted cup 48 is raised by means of the rod 41, any suitable form of stop means being provided to prevent lifting of the annular gap between the piston 42 and wall 49 beyond the upper end of the cylinder 37 (i.e. above the vicinity of the flange 38 by which the said cylinder is supported), the length of the inverted cup 48 with its gauge markings protrudes from the container up to the position of its base indicated at 48A, and the column of liquid contained therein is visible behind the gauge markings.

As shown in the upper part of FIG. 9, the cylinder has an extension 51 provided at its upper end with a screwed cap 52 through which the rod 41 passes, said cap having a vent 53. The extension 51 has an elongated aperture 54 through which the inverted cup 48 and its gauge markings are visible when the base of the cup is raised to the position 48A in contact with the cap 52 which serves as a stop. Such apertured extension serves as a protective shroud for the transparent inverted cup 48 when protruding from the container.

In order to provide for remote actuation of the indicator, it may be adapted for displacement of means for receiving and maintaining a column of the liquid pneumatically. FIG. 10 illustrates this adaptation of an indicator of the kind previously described with reference to FIG. 8. Two pistons 42, 46 maintained in spaced relationships by a rod 54 are slidable in a cylinder 37 and up into a transparent gauge element 19 having the same internal diameter. The lower end of the cylinder 37 is closed by a screwed cap 55 having an axial air duct 56 and an external screw-threaded spigot 57 to which a pipe 58 is secured by a gland nut 59. Another cap 60 is screwed into the upper end of the gauge element 19, this cap having a vent 61, and another pipe 62 is likewise secured to the cap 60 by a gland nut 63. The pipes 58 and 62 are taken to opposed ports 64 and 65 in the casing of a two-way change over valve 66, and a motive supply may be connected to another port S while the opposite port is open to atmosphere.

The motive supply may be air under super-atmospheric or sub-atmospheric pressure. Evidently, with the valve body 67 in the position shown, with air under pressure the spool comprising pistons 42 and 46 connected by rod 54 will be depressed to its lower limit position, the cylinder space beneath the piston 42 being connected by pipe 58 and through the valve 66 to atmosphere. On the other hand, with the valve in the same position and air under vacuum, said spool will be raised into the gauge element, atmospheric air being admitted below the piston 42. Turning of the valve body 67 through 90° will in either case effect the reverse displacement.

The cylinder 37 as previously described has at least one lateral port 45 located immediately above the upper surface of the piston 42 when in its lower limit position. In order to prevent leakage of liquid into a vacuum system, or leakage of air from a pressure system into the container, through this port 45, said lower limit position of the piston 42 is determined by an obturator 68 which depression of the piston 42 causes to bear on the lower cap 55. The obturator 68 is supported by a compression spring 69 and its upper limit of displacement by said spring is determined by a pin 70, screwed into the side of the cylinder 37 and projecting into a longitudinal groove 71 in the wall of the obturator.

When the spool maintaining a column of liquid is caused to rise the differential of air pressure being applied to the piston 42 through an axial bore 72 in the obturator 68, initially the piston 42 closes the port 45. Such closure is maintained by the obturator 68, following the piston 42 under the action of spring 69. The obturator is arrested by the pin 70 in the position shown in FIG. 11, while the spool continues to rise into the gauge element 19. Evidently, when the spool is again depressed piston 42 will first engage the obturator 68 and depress it against the force of spring 69, the piston maintaining closure of the port 45 until said piston attains the position shown in FIG. 10.

What we claim and desire to secure by Letters Patent is:

1. An indicator of the level of liquid in a container, comprising a tubular member of transparent material, means to support said tubular member on the container so that its lower end depends into the liquid, a valve seat at the lower end of said tubular member, a tensile element extending through said tubular member, a valve body supported by said tensile element below said seat, a knob secured to the upper end of said tensile element at such distance from the valve body as to permit said body to separate from the seat and so enable passage of the liquid into and from the lower part of said tubular member, a tubular sheath surrounding said tubular member, a support member clamped around said sheath, a sleeve whereof the lower part embraces the upper end of said sheath which is inwardly flanged, a wiper ring surmounting said upper end, said tubular member being a sliding fit in said wiper ring which serves to clean the exterior of said member and to hold it frictionally in a position to which it is displaced, the tubular member having at its lower end an annular enlargement serving as a stop to engage the inwardly flanged upper end of the sheath and limit upward displacement of the tubular member effected by said knob acting through the tensile element and closure thereby of said valve body upon the seat to maintain the received column of liquid, so that said column is visible against the gauge means.

2. An indicator of the level of liquid in a container, comprising an elongated cylinder, means to support the upper end of said cylinder on the container so that its lower end depends into the liquid to receive a column of the liquid having a height up to the upper level limit of said liquid in the container, a tubular extension of the cylinder external to the container and having the same internal diameter as said cylinder, at least said extension being made of transparent material, an air vent at the upper end of said extension, receiving means for said column of liquid comprising a piston slidable in said cylinder and the part of said cylinder above the piston, stop means for said piston at the lower end of said cylinder, an aperture in the wall of said cylinder which is just above the upper surface of the piston in its stopped lower position to permit passage of liquid into and from the cylinder above the piston, means to raise the piston initially to close said aperture and thereafter to raise the column of liquid into said transparent extension, the piston sliding within the cylinder and its said extension serving to maintain the received column of liquid, and gauge markings on said extension against which the raised column of liquid is visible.

3. A liquid level indicator as claimed in claim 2, including a second piston above and secured in spaced relationship to said one piston, said aperture permitting passage of liquid into and from the space enclosed by the cylinder between said pistons, and an air vent communicating with the upper part of said space.

4. A liquid level indicator as claimed in claim 2, having a tubular gauge element of transparent material surmounting said wiper ring and having its lower end embraced by the upper part of said sleeve, and gauge markings on said gauge element against which the received column of liquid is visible when the lower part of said tubular member is raised to be located within said gauge element.

5. A liquid level indicator according to claim 4, further comprising an externally screw-threaded portion at the upper end of said tubular gauge element, and an internally screw-threaded cap, engageable upon said portion to serve as said knob.

6. A liquid level indicator as claimed in claim 2, including a second piston above and secured in spaced relationship to said one piston, said aperture permitting passage of liquid into and from the space enclosed by the cylinder between said pistons, and an air vent communicating with the upper part of said space.

7. A liquid level indicator as claimed in claim 2, comprising receiving means for said column of liquid comprising a rod extending upwardly through said cylinder, said piston being secured to the lower end of said rod, and an inverted cup of transparent material secured to said rod so that the lower end of the wall of said cup is annularly spaced to a small extent from the upper surface of said piston, both the piston and the inverted cup being a sliding fit in the cylinder, an air vent communicating with the upper part of the interior of said cup, said aperture in the wall of the cylinder serving to permit passage of liquid into and from the space enclosed by said piston, said inverted cup and the cylinder, said enclosing means serving to maintain the received column of liquid when raised by said rod so that initially the piston closes said aperture and thereafter to a position such that said inverted transparent cup protrudes from the container, stop means being provided to arrest the receiving means prior to displacement of the annular spacing of the inverted cup and the piston from the cylinder, and gauge markings being provided on said cup.

8. A liquid level indicator as claimed in claim 2, further comprising pneumatic motive means for raising and depressing said piston and a column of liquid supported thereby, said pneumatic means including air ducts extending to the otherwise closed ends of said cylinder and said extension, and change over valve means whereby one end of the cylinder and said extension thereof is put into communication with atmosphere while the other end is put into communication with the motive source, and obturator enclosed in the lower end of the cylinder and resilient means biassing said obturator to follow the piston to a sufficient extent to close said aperture in the wall of the cylinder while the lower surface of said piston is raised above said aperture.

References Cited

UNITED STATES PATENTS

| | | | |
|---|---|---|---|
| 51,069 | 11/1865 | McCarthy | 33—126.4 |
| 980,320 | 1/1911 | Millea | 33—126.4 |
| 1,353,193 | 9/1920 | Townsend | 33—126.4 |
| 1,705,121 | 3/1929 | Jones | 33—126.4 |
| 1,976,434 | 10/1934 | Claus | 33—126.7 |
| 2,029,672 | 2/1936 | Rankin | 33—126.7 |
| 2,544,262 | 3/1951 | Hall | 33—126.4 |
| 3,199,199 | 8/1965 | Harrell et al. | 33—126.4 |

FOREIGN PATENTS 1,189,597  3/1959  France.

WILLIAM D. MARTIN, JR., *Primary Examiner.*